May 19, 1959
B. FRANKEL ET AL
2,887,671
ECHO ELONGATOR
Filed March 18, 1957
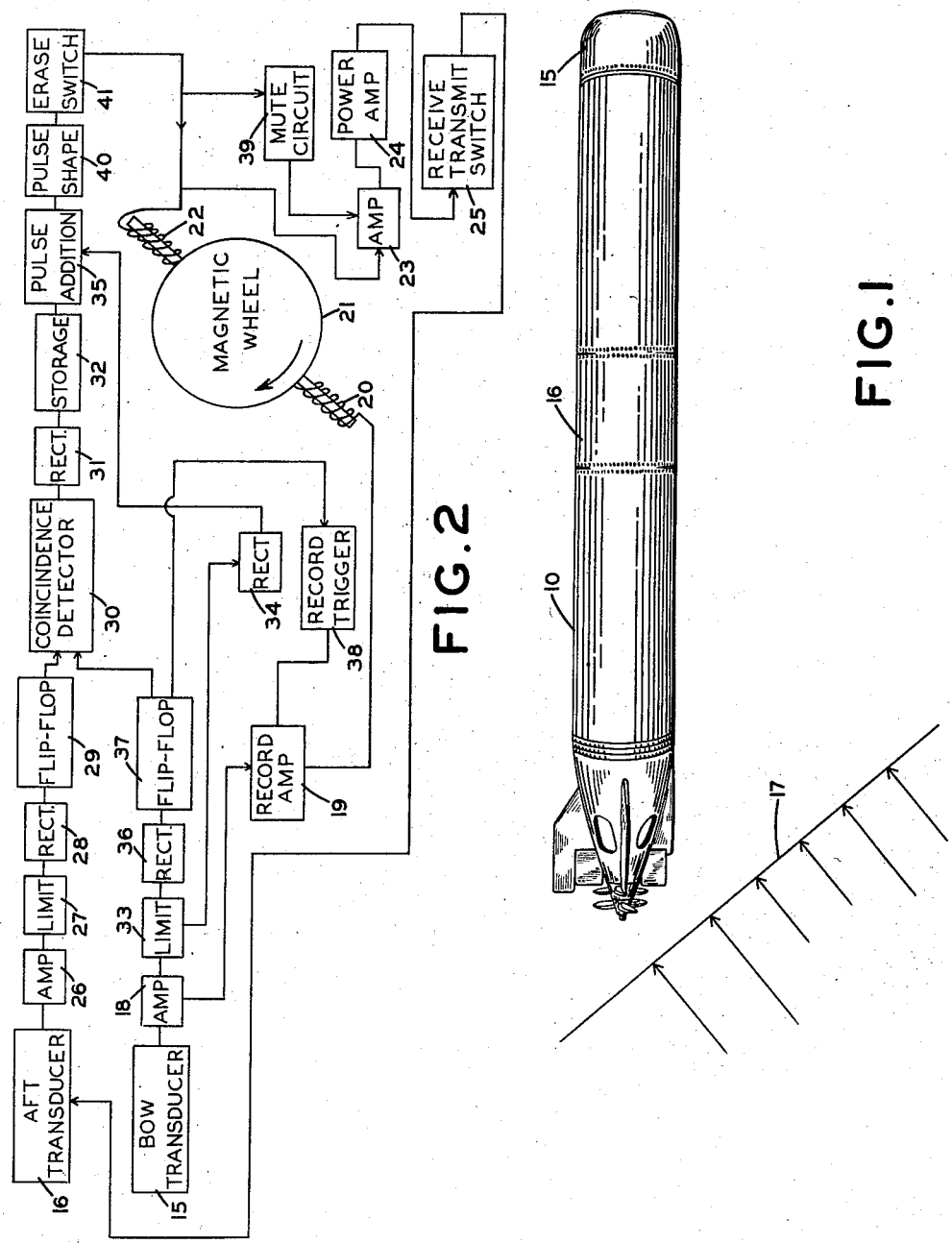
INVENTOR.
BURTON FRANKEL
FREDERICK B. CUPP
BY
ATTORNEY

United States Patent Office 2,887,671
Patented May 19, 1959

2,887,671

ECHO ELONGATOR

Burton Frankel, South Euclid, and Frederick B. Cupp, Cleveland, Ohio, assignors to Clevite Corporation, Cleveland, Ohio, a corporation of Ohio Application March 18, 1957, Serial No. 646,930

7 Claims. (Cl. 340—3)

This invention pertains to a sonar device used in the training of sonar operators to acquaint them with the characteristic sounds of a sonar ping returning from a submarine.

It is essential that sonar operators recognize the reflected sonar ping from a submarine and that they distinguish such a reflected sound from all other reflecting sources, and from other sound sources, of which there are many. In order to train sonar operators the Navy gives them considerable practice in recognizing a reflection from a submarine, but in the past this has entailed the use of a submarine as a target as well as the use of a sonar source. Using full-size, completely-manned submarines as targets to train the required large number of sonar operators becomes a vastly expensive operation, and it ties up a large number of submarines which are needed for other tasks.

In order to train sonar operators without tying up submarines, a submarine simulator has been devised which can be maneuvered in accordance with a built-in program. The unmanned submarine simulator is quite small compared to a standard size submarine, and because of this, if a sonar reflection is picked up from this small sized hull it will not be characteristic of a standard size submarine.

An object of the present invention is to provide a small, unmanned submarine simulator which sends a signal back to a sonar operator which is characteristic of a reflected signal from a full-size submarine.

It is an object of the present invention to provide a small submarine simulator which can receive a sonar ping and send a return signal to the sonar operator which in amplitude, frequency and duration is characteristic of a reflected sonar signal from a full-size submarine.

A further object of this invention is to provide a sonar training device which, while it is quite small, sounds like a reflection from a full-size submarine to the sonar operator.

For a better understanding of the present invention, together with other and further objects thereof, reference is had to the following description taken in connection with the accompanying drawings, and its scope will be pointed out in the appended claims.

An object of the present invention lies in the provision of a sonar device which preferably is in the form of an elongated, torpedo-like hull which can travel under water. The device has two spaced-apart receiving transducers, preferably mounted one on the bow and the other aft for receiving sonar pings. Within this hull are means for comparing the time relationship of the sonar pings as received by the forward and aft transducers. Signal generating means are located within the hull of the device and are connected to the comparing means for generating a signal having a characteristic which is a function of the time relationship, and transmitting transducer means are mounted on the hull of the device and are connected to the signal generating means for transmitting the generated signal away from the hull.

With reference to the single sheet of drawing there is shown in Figure 1 a schematic view of the submarine simulator and an approaching sonar wave front.

Figure 2 is a block diagram of the circuit of the submarine simulator.

With reference to Figure 1 there is shown a small submarine simulator 10 having a propeller and rudder system for driving and guiding it underwater. Within the hull which is very small compared to a submarine there is a propulsion plant and a system for putting the simulator 10 through a program of turning and diving operations. The simulator has a bow transducer 15 and an aft transducer 16 which is spaced away from the bow transducer 15.

The wave-front of an incoming sonar ping is shown at 17, and is illustrated as a plane wave-front due to the distance to the sonar source. This wave-front may approach the simulator 10 from aft, abeam or from the bow, and the system to be described will operate equally well. It is the business of this little simulator, which is only 10 feet long, to sound like a 300′ or 400′ submarine to the sonar operator located at a distance away from the simulator. Thus the signal which it sends back to the sonar operator must, in amplitude and in duration, be equivalent to the reflection from a submarine which is say, 40′ in diameter and 400′ long. Furthermore, the "reflected" signal from the simulator must "sound like" a submarine for all angular relationships between the sonar source and the simulator. To do this the simulator repeats the incoming signal, sending it back to the sonar operator with amplification, and it elongates the "echo" by an amount which is a function of the size of the submarine which the device is simulating and by an amount dependent upon the angle between the wave-front 17 and the longitudinal axis of the hull of the simulator 10. The less this angle, down to zero degrees, the shorter the "echo," and at zero degrees the echo length is approximately equal in length to that of the received sonar ping.

The "echo repeater" circuit operates in conjunction with the bow transducer 15, which receives the incoming sonar ping, amplifies it at 18 and again at the recording amplifier 19, and applies the signal to the input of a magnetic recording head 20. The magnetic recording head 20 records the signal on the rapidly rotating magnetic wheel 21. The diameter of the wheel 21 is small and its rate of rotation is sufficiently high that the recorded signal occupies the full 360 degree path around the wheel. If the "ping" is long and occupies more than 360 degrees of rotation it does not disturb the operation of the device.

When the signal magnetically recorded on wheel 21 reaches reproducing head 22 it is reproduced, amplified at 23 and 24 and through switch 25 is applied to the aft transducer 16 where it is sent back to the sonar operator in the form of an amplified "echo," strong enough to have been reflected from a large submarine.

The elongater circuit computes the duration of the "echo" in accordance with the size of the "submarine," the length of the ping, and in accordance with the aspect angle between the wave-front 17 and the axis of the simulator 10. The size of the submarine is fixed, but the aspect angle varies during the training exercise and the length of the ping may vary.

When the wave-front 17 approaches from abeam, the aft and bow transducers receive the impulse simultaneously and the arrival time difference of the two transducers will be zero. However, at bow or stern aspects the arrival time difference may reach a maximum of about .9 millisecond because of the hydrophone spacing of about five feet and the speed of sound in water. With the device of this invention it makes no difference whether the bow or the aft hydrophone is first energized by the incoming signal, as the circuit operates to repeat and elongate the signal in accordance with the aspect angle no matter which of the two hydrophones first receives the impulse.

The magnetic head 22, in addition to being a reproducing head, also serves to erase the magnetic signal recorded on the magnetic wheel 21 following each transmission period.

When a sonar ping is first received by the aft transducer 16, the transducer output is amplified at 26 limited at 27, rectified at 28 and used to start a flip-flop circuit 29. The output from the flip-flop is applied to a coincidence detector circuit whose output is rectified by rectifier 31 and stored for a short period of time in a signal storage circuit 32. Subsequently the ping is received by the bow transducer 15 whose output is amplified at 18 and limited by limiter 33. Here the output is split, part being applied to rectifier 34 and then to the pulse addition circuit 35. The other part of the signal from the limiter 33 is rectified at rectifier 36 and is then applied to a flip-flop circuit 37 to terminate the action of the coincidence detector circuit 30. The output of the coincidence detector circuit 30 is rectified at 31 and stored in 32.

Either hydrophone can start the action of the coincidence detector circuit upon first receiving the sonar ping, and the other hydrophone then terminates the action of the coincidence detector circuit, the flip-flop circuits, and the coincidence detector producing a signal whose duration is dependent upon the time delay between the two hydrophones 15 and 16 receiving the sonar ping. This signal is stored in the signal storage device 32, and in the pulse addition circuit 35 is added to the sonar ping as received by the bow transducers 15. Thus, out of the pulse addition circuit 35 there will be sent a signal whose duration is equal to the time interval of the original sonar ping as received by transducer 15 plus a time interval dependent upon the receipt of the ping at the two hydrophones 15, 16.

The front of the elongated signal derived from the pulse added 35 is applied, after shaping at 40, to the erase switch 41 shutting off the erase current to the erase head 22, converting head 22 to a reproducing head and supplying the reproduced signal from wheel 21, through amplifiers 23, 24 and switch 25 to the output transducer 16 until the end of the elongated signal out of the circuit 35 returns the reproducing head 22 to an erase head by actuating switch 41. Thus the signal recorded on the magnetic wheel 21 is reproduced for a length of time equal to the length of time of the sonar ping plus the time delay between the first and second transducers receiving the sonar ping. During this time the wheel 21 may rotate several complete revolutions while its reproduced signal is being sent back to the sonar operator, thus simulating a large size submarine. The frequency of the signal returned to the sonar operator will be the same as the incoming sonar signal since the signal was recorded directly on the magnetic wheel and was reproduced therefrom and applied to the aft transducer for transmittal back to the sonar operator. It is within the scope of this invention to use a transmitting transducer which is independent of either of the two receiving transducers.

When the system within the submarine simulator is at rest, that is, no sonar ping is actually being received or transmitted, the magnetic wheel 21 is running and both of the transducers 15, 16 are receiving random noise. The random noise received by the bow transducer 15 is not magnetically recorded on the wheel 21 since the record amplifier 19 is maintained in a non-transmitting state by a record-trigger circuit 38. When a sonar ping of a given amplitude, great compared to the ambient noise, is received by the bow transducer 15 an output signal from the flip-flop circuit actuates the trigger circuit 38 and connects the recording amplifier 19 to the recording head 20 for recording the sonar pulse on the magnetic wheel 21.

A muting circuit 39 is connected in parallel with the reproducing head 22 between the erase switch 41 and the transmitting amplifier 23. While the system is listening for a sonar ping the muting circuit operates to inactivate the amplifier 23 thus preventing the aft transducer 16 from continually transmitting amplified noise signals. Upon the receipt of an incoming sonar signal the erase switch 41 inactivates the mute circuit 39, thereby putting amplifier 23 in operating condition to amplify the signal reproduced from the magnetic wheel 21, and when the signal transmitting circuit has finished sending out the amplified sonar signal the muting circuit 39 returns amplifier 23 to its quiet condition.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:

1. In a sonar device, an elongated hull to be placed underwater and having a forward and an aft transducer for receiving a sonar ping, comparing means mounted in said hull for comparing the time relationship of arrival of a given ping as received by said forward and aft transducers, means connecting said forward and aft transducers to said comparing means, signal generating means connected to said comparing means for generating a signal having a characteristic which is a function of said relationship, and transmitting transducer means mounted on said elongated hull and connected to said signal generating means for transmitting said generated signal.

2. A sonar device as set forth in claim 1, further characterized by said transmitting transducer means comprising one of said forward and aft transducers.

3. In a sonar device, an elongated hull to be placed underwater and having a forward and an aft transducer for receiving a sonar ping, comparing means mounted in said hull for comparing the time of arrival relationship of the ping as received by said forward and aft transducers, means connecting said forward and aft transducers to said comparing means, signal generating means connected to said comparing means for generating a signal whose duration is a function of said comparison, and transmitting transducer means mounted on said elongated hull and connected to said signal generating means for transmitting said generated signal.

4. In a sonar device, an elongated hull to be placed underwater and having a forward and an aft transducer for receiving a sonar ping, comparing means mounted in said hull for comparing the time of arrival relationship of the ping as received by said forward and aft transducers, means connecting said forward and aft transducers to said comparing means, signal recording means connected to one of said transducers for recording said sonar ping, signal reproducing means associated with said signal recording means and controlled by said comparing means for generating a signal whose duration is a function of said comparison, and transmitting transducer means mounted on said elongated hull and connected to said signal reproducing means for transmitting said generated signal.

5. In a sonar device, a hull to be placed underwater and having spaced apart transducers for receiving a sonar ping, comparing means mounted in said hull for comparing the time of arrival relationship of the ping as received by said two transducers, means connecting said two transducers to said comparing means, signal recording means mounted within said hull and electrically connected to said transducers for recording a signal thereon, reproducing means associated with said signal recording means for reproducing the recorded signal therefrom, means connecting said reproducing means to one of said transducers for transmitting the reproduced signal away from said hull, and signal erasing means associated with said signal recording means and electrically connected to said comparing means to control the erasing of the signal recorded thereon in accordance with the relationship of the signals received by said two spaced apart transducers.

6. A sonar device as set forth in claim 5, further characterized by said signal recording means comprising a magnetic recording device.

7. In a sonar device, a hull to be placed underwater and having spaced apart fore and aft transducers for receiving a sonar ping, endless magnetic recording means mounted within said hull and connected to one of said transducers for recording the signal picked up by said transducer, reproducing means associated with said magnetic recording means for reproducing the signal therefrom, transmitting transducer means mounted on said hull and connected to said reproducing means for transmitting away from said hull the signal reproduced from said magnetic recording means, signal interrupting means connected to said reproducing means for interrupting the transmission of said reproduced signals, comparing means mounted in said hull for comparing the time of arrival relationship of a sonar ping as received by said forward and aft transducers and connected to said signal interrupting means for determining the length of time said reproduced signal is transmitted away from said hull.

References Cited in the file of this patent

UNITED STATES PATENTS 2,694,868     McMillan ------------ Nov. 23, 1954